Patented July 7, 1942

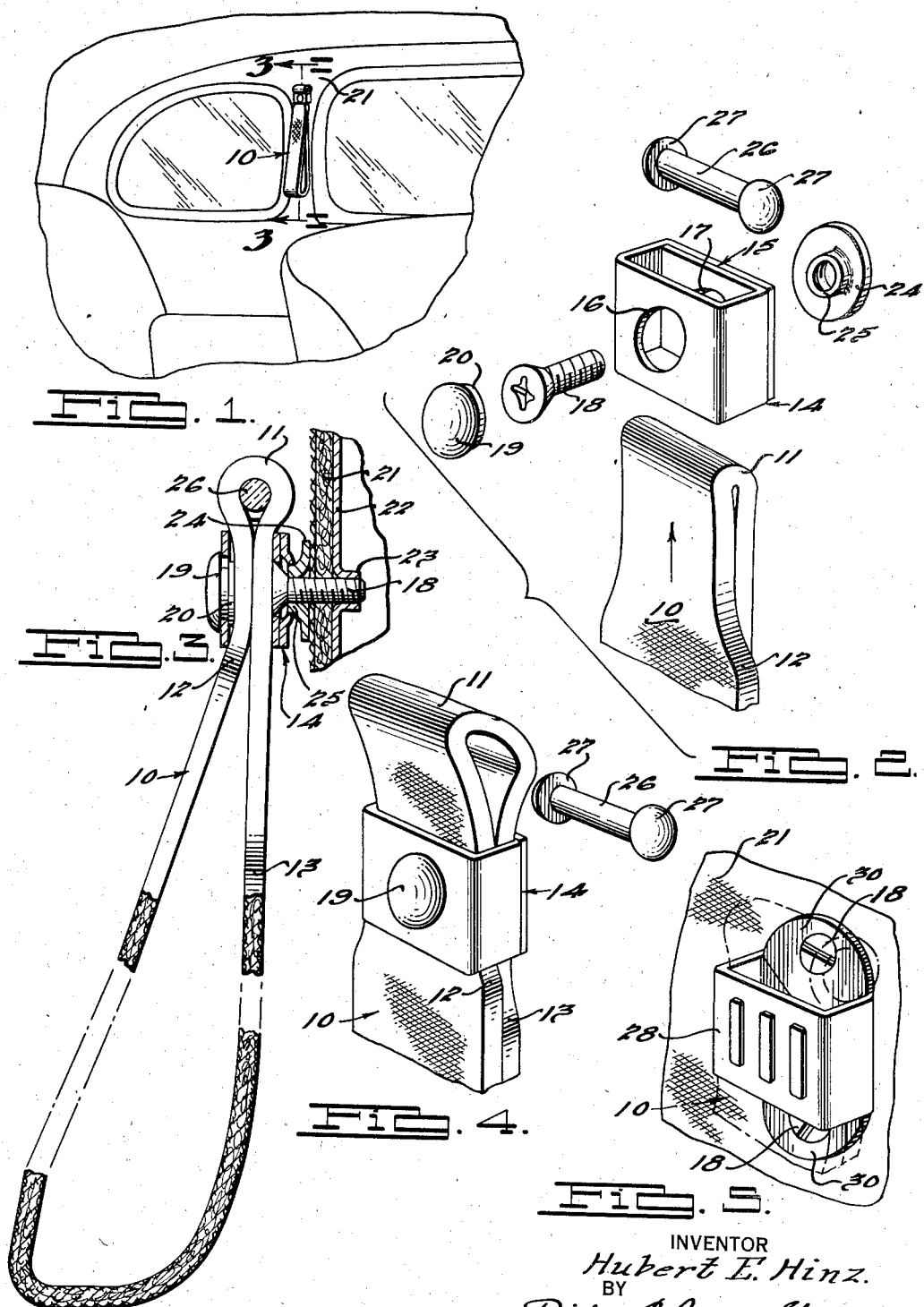

2,288,708

UNITED STATES PATENT OFFICE 2,288,708

ASSIST CORD ASSEMBLY

Hubert E. Hinz, Detroit, Mich., assignor to Briggs Manufacturing Company, Detroit, Mich., a corporation of Michigan Application May 13, 1940, Serial No. 334,765

12 Claims. (Cl. 105—354)

The present invention relates to new and useful improvements in assist cord assemblies adapted particularly, although not exclusively, for use in the interior of automobile bodies. In vehicle or automobile body construction it has been customary to provide so-called assist cords or straps upon the interior walls of the vehicle body. These assist cords or straps are manually gripped or grasped by an occupant of the vehicle to assist him in rising or leaving the car, to prevent a fall, or for supporting or bracing himself against undesirable pitching.

One object of the present invention is to provide an assist cord or strap assembly of compact, sturdy, economical and durable construction insuring a proper transfer of strains and pulling forces to the vehicle wall while at the same time being attractive and ornamental in appearance; and one which is capable of easy and quick assembly and installation.

Another object of the invention is to provide an assist cord assembly which is securely attached to its supporting surface, but which is movable relatively thereto, in particular one which may swivel on fixed parts of its attaching means, thus providing a device or assembly which is convenient and effective for manual gripping purposes.

A more specific object of the invention is to provide an improved assist cord assembly including a slotted retainer confining in its slot, portions of a strip having its ends secured together to form a continuous assist cord. This strip is provided with looped portions extending from the retainer, one of which is elongated and especially adapted to be manually gripped or grasped, while another looped portion of the strip is provided with holding means such as a bar for preventing the strip from being undesirably pulled or otherwise removed from the retainer when the elongated loop is grasped.

Another more specific object of the invention is to provide an assist cord assembly of the foregoing character in which the strip forming the assist cord is provided with narrowed portions adapted to fit within the retainer. In this connection such narrowed portions may continue appreciably farther along one side of the strip than they do along the other side thereof, thereby permitting the last said side to be pushed through the retainer to enlarge the loop intended to receive the strip holding means and consequently to render the insertion of such means convenient and easy. After such insertion the same portion of the strip may be just as easily pulled through the retainer to tighten the loop about the holding means in assembled relationship.

Other objects and advantages of this invention will appear in the following description and appended claims, reference being had to the accompanying drawing forming a part of this specification wherein like reference characters designate corresponding parts in the several views.

Fig. 1 is a fragmentary perspective view of the rear interior of a vehicle body of the closed type and shows a preferred embodiment of the present invention applied to an interior wall of the vehicle body.

Fig. 2 is an exploded perspective view depicting the various parts of the embodiment of the invention shown in Fig. 1, and indicating one method of assembling them.

Fig. 3 is a central longitudinal section of the form of the invention shown in Fig. 1 and is taken substantially along the line 3—3 of Fig. 1 in the direction of the arrows.

Fig. 4 is a detail view in perspective showing one form of retaining means utilized in connection with the present invention, and depicting in particular one form of holding means for preventing the assist cord from being undesirably removed from the retainer.

Fig. 5 is a perspective view showing in particular one modified form of assist cord retaining means which may be used in connection with the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing, one form of assist cord assembly embodying the present invention is there shown in one of its applications, namely as applied to the interior wall of an automobile body. The assembly is applied to a rear interior panel of the automobile body adjacent a rear window. It will be understood however that this location is but a preferred one. Other suitable and convenient places for mounting the assembly are evident and are contemplated herein.

The assembly, as shown, includes an assist cord or hand-hold indicated generally by the reference numeral 10, which is preferably made from a continuous strip of strong flexible material such as a length of fabric, heavy cloth, cord, leather or the like. The ends of the strip forming the hand-hold 10, are preferably sewed or otherwise secured together. Thus the strip forms continuous assist cord, referred to hereinafter as "endless" since it resembles an endless belt in construction. This assist cord is provided with narrowed portions as clearly illustrated in Fig. 2. These narrowed portions are adapted to fit within and to be accommodated by the retaining means in the manner more fully pointed out hereinafter. It will be noted that these narrowed portions extend along both sides of the assist cord 10 and about one end thereof shown at 11. This structure of the assist cord provides shoulders 12 and 13 (Figs. 3 and 4) at the points where the narrowed portions of the cord begin. As best shown in Fig. 3, the shoulder 13 on one side of the assist cord is positioned farther down the cord than the shoulder 12 on the other side thereof. Consequently the narrowed portion of the assist cord continues appreciably farther along one side of the cord than it does along the other. This feature permits the ready assembly of the assist cord relative to the retainer in a manner more fully pointed out hereinafter.

The reference numeral 14 indicates, in general, a retainer member for receiving the assist cord 10. This retainer member is preferably generally box-like in shape, but is provided with open ends. In other words, the retainer member is of a closed configuration provided with a slot 15 (Fig. 2) running throughout its length. While this retainer member is shown in the drawing as generally rectangular in shape, it may be of any shape and of any design and construction adapted to receive the assist cord 10. The retainer member 14 is preferably formed of metal such as sheet steel or the like bent into the aforesaid configuration. In this connection it may be provided with overlapping portions as shown in Fig. 2. However, the retainer member 14 may be formed of any suitable material such as a plastic, wood or the like. In addition, the retainer member is provided with a suitable ornamental finish.

The spaced front and rear walls of the retainer member 14 of the preferred form of the invention (Figs. 1 to 4 inclusive) are provided with aligned openings 16 and 17 (Fig. 2). The opening 17 is dimensioned and constructed to receive a fastening element or member 18 such as the screw shown in the drawing. Since the opening 16 is aligned with the opening 17 it will be seen that the opening 17 is accessible and that the fastening element 18 may be readily inserted through the opening 16 and then placed in the opening 17. Consequently, the opening 16 is dimensioned to permit the fastening element 18 to be completely passed therethrough while the opening 17 is dimensioned to receive the fastening element or parts thereof, such as the taper head of the screw shown at 18, in the manner illustrated in Fig. 3. After the insertion of the fastening element 18 in the opening 17, a closure or cap 19 is inserted in the opening 16. The closure 19 may be of any suitable construction but is preferably formed of a plastic material and is ornamental or decorative in appearance. The cap 19 may be secured within the opening 16 by any suitable means. For instance, it may be snapped into place and retained therein by means of a ridge portion as shown at 20 (Fig. 3).

The cap 19 may, however, be dispensed with if desired. The opening 16 may also be dispensed with provided that the fastening element 18 may be assembled with respect to the retainer member 14 by other suitable means. In this regard the retainer member 14 may be constructed to permit it to be secured to the supporting surface 21, 22 by fastening elements accessible from outside the spaced walls of the retainer member. The modified retainer 28 (Fig. 5) embodies one such retainer member and is provided with extending portions or ears 30, 30 having openings for receiving the fastening elements 18.

The fastening element or elements 18 secure the retainer member 14 or 28 to a suitable supporting surface or member. For example, fastening elements 18 may be passed through suitable openings in the trim panel 21 as well as a metallic backing panel 22 of the vehicle body. The backing panel 22 may be provided with a screw boss 23 suitably threaded to receive each fastening element or screw 18. However, it will be understood that the fastening element 18 may be suitably secured to its supporting surface by any operable means such, for instance, as by means of a nut and washer. In addition, the fastening element 18 may be secured to any suitable supporting surface although it is shown in the drawing as secured to the body panel. For example, it could be secured to a door pillar, a suitable bracket or flanging or the like.

The reference numeral 24 indicates in general a washer-like member inserted between the trim panel 21 and the retainer member 14. The member 24, it will be observed, is carried by the fastening element 18 and is held against the trim panel 21 or other supporting surface by the fastening element 18 and the retainer member 14 which presses against it. In this connection the member 24 is provided with a boss 25 (Fig. 2) which is dimensioned and constructed to fit through the opening 17, and thus to contact the head of the fastening element or screw 18 in the manner shown in Fig. 3. This structure of the member 24 together with its assembly relative to the fastening element 18 and retainer member 14, provides for the contacting of the outside portion of the boss 25 by the interior portions of the opening 17. Consequently the retainer member 14 may swivel about the fastening element 18 and the member 24, and may move or turn relative to the supporting surface. In other words, the outer portions of the boss 25 operate as a bearing surface for the retainer member 14. In this connection the lip portions of the opening 17 may be somewhat rounded or bent to aid in snugly contacting the boss 25 as shown in particular in Fig. 3.

The assist cord assembly described above may be assembled and installed upon a supporting surface as follows: The retaining member 14 and the washer-like member 24 are assembled with the boss 25 of the washer-like member 24 inserted in the rear portion of the opening 17 as illustrated in Fig. 3. The members 14 and 24 are then placed in alignment with a suitable opening in the supporting surface and the fastening element or screw 18 is passed through the opening 16 and inserted in the opening 17. This fastening element is then threaded into the screw boss 23 or is otherwise firmly secured to the supporting surface to hold the retainer 14 and member 24 in assembled relationship on the supporting surface. It will be noted that the head of the fastening element or screw 18 is tightened against the boss 24 so that the fastening element may be very firmly threaded or secured in place and yet permit movement of the retainer 14. In particular, the retainer 14 may swivel about the element 18 as a pintle and in so doing will movably contact the boss 25 as a bearing surface. In this connection the boss 25, the head of the screw 18, and the thickness of the rear wall of the retainer 14 are such that the retainer member will be firmly but movably retained in place when assembled in the foregoing manner. The modified retainer member 28 is applied to the supporting surface 21, 22 by inserting the fastening elements 18 in the openings in the ears 30 and fixing them in place on the supporting surface.

After the attachment of the retainer member to the supporting surface the assist cord 10 is inserted in the retaining member. The manner in which the assist cord is so inserted is clearly indicated in Fig. 2. The cord is placed beneath the slot 15 in the retainer 14 with its narrowed portions directed toward the slot. The assist cord is then pushed through the slot 15 in the direction of the arrow of Fig. 2 until the end 11 thereof extends beyond the retainer member. The side of the assist cord 10 shown at 13 is then pushed through the retainer member thereby forming and continuously enlarging a loop (shown at 11) above the retainer 14 in the manner clearly indicated in Fig. 4. It will be noted that it is necessary to push one side only of the assist cord 10 through the slot 15, and this side is preferably provided with a lengthened narrowed portion permitting it to fit through the slot. The other side of the assist cord (shown at 12) is prevented from passing through the slot 15 by the shoulder 12, see Figs. 3 and 4. However, if desired, the assist cord may be constructed to permit both sides to be pushed through the retainer to form the loop shown at 11. After the formation of this loop, a holding member is situated within the loop for preventing the assist cord 10 from being pulled down through the retainer 14. This holding member is indicated at 26; and, as there shown, may consist of a cylindrical bar with enlarged heads or ends 27, 27. However, the member 26 may be of any suitable size and shape and may be formed of any suitable material, although it is recommended that it be formed of a plastic since a plastic will give a decorative appearance to the assembly. The member 26 after insertion in the loop shown at 11 is retained in this loop by a retraction of the side 13 of the assist cord 10. This side is pulled through the retainer member to tighten the loop 11 about the member 26 in the manner clearly shown in Fig. 3. It will be appreciated that the enlarged heads 27, 27 prevent the bar 26 from being undesirably removed from the assembly by being laterally pushed through the loop 11. It will also be appreciated that the bar 26 prevents the assist cord 10 from being pulled through the slot 15 in the retainer 14 and therefore holds the assist cord 10 and retainer 14 in assembled relationship.

In view of the foregoing description of the present invention, it will be readily understood that a pair of loops is provided in the assist cord 10, each of which projects from one open end of the retainer member 14. Moreover, the retainer member 14 is preferably mounted on the supporting surface so that the slot 15 therein is in a generally vertical plane. Consequently, one of these loops may aptly be referred to as an upper loop which is provided with the holding means 26. The other loop may be aptly referred to as a lower loop, and is elongated to provide a portion of the assist cord especially suited for manual clasping or gripping.

It will therefore be readily understood that the present invention provides a simple and durable assist cord assembly which is attractive and ornamental in appearance. In addition, the assist cord forming a part of this assembly may be very easily assembled and applied to a supporting surface. In addition, in the preferred form of the invention, the retainer member and the assist cord when mounted is movable with respect to the supporting surface and in particular may swivel with respect thereto. Consequently, the assist cord assembly of the present invention may be very easily gripped and is most convenient to use.

I claim:

1. An assist cord assembly comprising a flexible strip formed into an assist cord, retaining means for securing the cord to a support, said cord having portions of two adjacent substantially parallel strands confined by said retaining means, continuations of said portions extending beyond said retaining means in one direction to form a loop and other continuations of said portions also extending beyond the retaining means in another direction to form an additional loop, and means operably associated with and supported by the first named loop for preventing the strip from being undesirably removed downwardly from the retaining means.

2. An assist cord assembly comprising an open ended retainer, a strip having its ends secured together to form a continuous assist cord having adjacent substantially parallel portions confined within said retainer and having a looped portion extending from each open end of the retainer, means independent of the retainer and situated in one loop for preventing the assist cord from being undesirably removed downwardly from the retainer, and means operably associated with said retainer for securing the assembly to a support.

3. An assist cord assembly comprising an open-ended retainer, a strip having its ends secured together to form an endless continuous assist cord, said cord having two adjacent substantially parallel portions confined within said retainer and having a looped portion extending from each open end of the retainer, holding means situated in one loop for preventing the assist cord from being downwardly removed from the retainer, and securing means independent of said strip and operably associated with said retainer for removably attaching the assembly to a support to permit movement of the retainer, strip, and holding means relative to the support.

4. An assist cord assembly comprising an endless flexible strip, retaining means for removably securing the assembly to a support and for confining two adjacent substantially parallel portions of said strip, continuations of said portions projecting from an opening in said retaining means to form a looped end of a strip for receiving a bar and other continuations of said strip projecting from another opening in said retaining means to form an elongated loop for manual gripping, a bar inserted and held in said first named loop, and means for preventing said elongated loop from being freely removed upwardly from said retaining means.

5. An assist cord assembly comprising a box-like retainer having open ends, a flexible strip having its ends secured together to form an endless continuous assist cord, intermediate portions of said cord being confined and held within said retainer in a substantially parallel relationship, an end portion of said cord extending through one open end of the retainer to form a relatively small loop, the remaining portions of said cord extending through the other open end of the retainer to form an additional and elongated loop for manual grasping, a bar inserted in said relatively small loop to prevent the cord from being pulled from the retainer when the elongated loop is grasped, and means for removably securing the retainer to a support attached to said retainer to permit swiveling movement of the retainer relative to the support.

6. An assist cord assembly comprising a closed box-like retainer having a slot extending therethrough and an opening for receiving a fastening element, a fastening element in said opening for securing the retainer to a support with its slot in an embossed generally vertical plane, a member held against said support by said fastening element and having a bearing surface movably contacted by said retainer, whereby said retainer when secured to said support may swivel relative thereto, a flexible strip having its ends secured together to form an endless continuous assist cord, intermediate portions of each side of said cord being held by and confined within the slot in said retainer in an adjacent overlaying substantially parallel relationship, continuations of said confined portions extending above the upper end of the retainer to form a relatively small loop, other continuations of said confined portions depending below the lower end of the retainer to form an additional and elongated loop for manual grasping, and a bar inserted in said relatively small loop to prevent the cord from being pulled through the slot in the retainer when the elongated loop is grasped.

7. A box-like retainer member for an assist cord and having open ends thereby providing a slot extending through the member for receiving an assist cord, said member being provided with aligned openings in its spaced walls, one opening being adapted to receive a fastening element and the other opening being positioned to make said first named opening accessible, and a decorative closure for closing said second named opening after the insertion of said fastening element.

8. An assist cord assembly comprising an endless flexible strip having a narrowed portion along parts of each of its sides, an open-ended retainer having a slot accommodating and confining adjacent substantially parallel parts of said narrowed portions continuations of which project through the upper open end of the retainer to form a loop, the remaining portions of each side of the strip being of a width substantially greater than the width of the slot of said retainer for resisting undesirable upward movement of the assist cord, said remaining portions depending from a lower part of the retainer to provide an elongated loop for manual gripping, and means inserted within said first named loop for preventing the assist cord from being pulled from the retainer when said elongated loop is gripped.

9. An assist cord assembly comprising a retainer having a slot extending therethrough for receiving an assist cord, a flexible strip adapted to form an assist cord and provided with narrowed portions adjacently confined in substantially parallel relation in said slot, said narrowed portions continuing in one direction above said retainer to form a loop and also continuing in another direction along one side of the strip to permit said side to be moved through said slot to decrease and increase the size of said loop, the remaining portion of said flexible strip being of a width substantially greater than the width of the slot of said retainer for preventing the assist cord from being freely removed upwardly from said retainer, means retained by said loop for preventing the assist cord from being undesirably removed downwardly from the retainer, and means for securing the retainer to a support.

10. An assist cord assembly comprising an open-ended retainer, a flexible strip forming an assist cord, said cord having a looped portion extending from each open end of the retainer and adjacent substantially parallel portions confined by the retainer between the open ends thereof, and holding means situated in one looped portion and independently removable therefrom for preventing the assist cord from being removed downwardly from the retainer upon exerting a downward pull on the other looped portion.

11. An assist cord assembly comprising an open-ended retainer, a flexible strip forming an assist cord, said cord having a looped portion extending from each open end of the retainer and adjacent substantially parallel portions confined by the retainer between the open ends thereof, holding means situated in one looped portion and independently removable therefrom for preventing the assist cord from being removed downwardly from the retainer upon exerting a downward pull on the other looped portion, and securing means independent of said strip and operably associated with said retainer for removably attaching the assembly to a support to permit movement of the retainer, strip, and holding means relative to the support.

12. An assist cord assembly comprising an open-ended retainer, a flexible strip forming an assist cord, said cord having a looped portion extending from each open end of the retainer and adjacent substantially parallel portions confined by the retainer between the open ends thereof, and holding means situated in one looped portion for preventing the assist cord from being removed downwardly from the retainer upon exerting a downward pull on the other looped portion, said strip having means limiting free movement of the last named looped portion upwardly beyond a predetermined amount.

HUBERT E. HINZ.

CERTIFICATE OF CORRECTION.

Patent No. 2,288,708.                                                                     July 7, 1942.

HUBERT E. HINZ.

It is hereby certified that error appears in the printed specification of the above numbered patent requiring correction as follows: Page 4, first column, lines 20 and 21, claim 6, for "in an embossed generally vertical plane, a member" read --in a generally vertical plane, an embossed member--; and line 29-30, same claim, strike out "overlaying"; and that the said Letters Patent should be read with this correction therein that the same may conform to the record of the case in the Patent Office.

Signed and sealed this 1st day of September, A. D. 1942.

Henry Van Arsdale, (Seal)                                    Acting Commissioner of Patents.